(12) United States Patent
Beydler et al.

(10) Patent No.: US 9,132,487 B2
(45) Date of Patent: Sep. 15, 2015

(54) TOOL FOR REMOVING BROKEN THREADED FASTENERS

(71) Applicants: Scott A. Beydler, Lebanon, OR (US);
Charles R. Beydler, Redlands, CA (US)

(72) Inventors: Scott A. Beydler, Lebanon, OR (US);
Charles R. Beydler, Redlands, CA (US)

(73) Assignee: Beydler CNC, Lebanon, OR (US)

( * ) Notice: Subject to any disclaimer, the term of this patent is extended or adjusted under 35 U.S.C. 154(b) by 507 days.

(21) Appl. No.: 13/674,632

(22) Filed: Nov. 12, 2012

(65) Prior Publication Data

US 2014/0133928 A1    May 15, 2014

(51) Int. Cl.
*B23B 47/28*    (2006.01)
*B23B 49/02*    (2006.01)

(52) U.S. Cl.
CPC ............. *B23B 49/026* (2013.01); *B23B 47/284* (2013.01); *B23B 2247/12* (2013.01); *Y10T 408/567* (2015.01)

(58) Field of Classification Search
CPC .... B23B 47/284; B23B 47/28; B23B 49/023; B23B 49/02; B23B 2247/12; Y10T 408/567; B25B 27/18
USPC ........................................ 408/115 R; 81/53.2
See application file for complete search history.

(56) References Cited

U.S. PATENT DOCUMENTS

| | | | | |
|---|---|---|---|---|
| 1,160,267 A | * | 11/1915 | Davis | 408/72 R |
| 1,597,468 A | * | 8/1926 | Holehouse | 408/111 |
| 2,408,450 A | * | 10/1946 | Schrader | 81/53.2 |
| 2,864,268 A | * | 12/1958 | Anderson | 408/79 |
| 3,148,562 A | | 9/1964 | Moss | |
| 3,769,648 A | * | 11/1973 | Haselmo | 470/209 |
| 3,799,687 A | * | 3/1974 | Anderson | 408/75 |
| D254,074 S | * | 1/1980 | Ringle | D15/138 |
| 4,194,861 A | * | 3/1980 | Keller | 408/109 |
| 4,388,921 A | * | 6/1983 | Sutter et al. | 606/71 |
| 4,733,996 A | * | 3/1988 | Catapano | 408/79 |
| 4,759,666 A | | 7/1988 | Grab | |
| 4,813,820 A | * | 3/1989 | Cadwell et al. | 408/1 R |
| 5,025,556 A | | 6/1991 | Stafford | |
| 5,529,442 A | | 6/1996 | Jorgensen | |
| 5,544,987 A | | 8/1996 | Gipson | |
| 6,435,781 B1 | | 8/2002 | Jones | |
| 7,229,237 B1 | | 6/2007 | Fulgham | |
| 8,529,171 B1 | * | 9/2013 | Luke | 408/115 R |
| 2005/0204542 A1 | * | 9/2005 | Pittman | 29/566 |
| 2011/0002751 A1 | | 1/2011 | Katzenberger | |

FOREIGN PATENT DOCUMENTS

| | | | |
|---|---|---|---|
| DE | 102008053903 A1 | * | 9/2009 |
| EP | 2025438 A2 | * | 2/2009 |
| FR | 2790692 A1 | * | 9/2000 |
| GB | 2269334 A | * | 2/1994 |
| GB | 2456546 A | * | 7/2009 |

* cited by examiner

*Primary Examiner* — Daniel Howell
(74) *Attorney, Agent, or Firm* — Mersenne Law

(57) ABSTRACT

A guide for drilling holes into broken threaded fasteners includes an application-specific template having surface features and holes situated to allow the template to be secured to the workpiece using remaining unbroken fasteners, and a drill guide that can be secured to the template and adjusted to lock into position over the broken fastener. The guide helps ensure that a drilling operation aligns with the center (and the centerline) of the broken fastener, so that the fragment can be removed with less risk of damage to the threaded hole.

14 Claims, 5 Drawing Sheets

TOOL FOR REMOVING BROKEN THREADED FASTENERS

CONTINUITY AND CLAIM OF PRIORITY

This is an original U.S. patent application.

FIELD

The invention relates to tool-guiding structures adapted to contact the work. More specifically, the invention relates to templates adapted to be secured to a surface, having a guide for cutting by use of a rotating axially-moving tool, said guide configured to be fixed to the template in any one of a plurality of discrete locations.

BACKGROUND

Threaded fasteners such as bolts and studs are widely used to connect, attach and secure machine subassemblies to each other. Bolts can be used alone (e.g., screwed into threaded holes in a structure) or with complementary threaded elements such as nuts, to apply a compressive force between facing surfaces, to resist shear forces acting to slide one element across the other, or to provide (and/or resist) a combination of forces.

Bolts are usually made of a tough material with a high tensile strength, sized well in excess of the design loads expected to be encountered in the particular application, but wear, fatigue, unexpected loading and over-zealous tightening occasionally cause breakage. If both ends of the bolt are accessible, then the broken bolt can be removed and replaced simply, but it often occurs that a portion of a threaded fastener is left inside its threaded hole after a break. Sometimes these fragments can be teased out by careful manipulation with a pick, but more commonly, it is necessary to drill into the fastener body and either collapse the outer threaded shell of the fastener or insert a reverse-threaded extraction tool into the hole to assist in removing the fragment.

Because threaded fasteners are usually made of a tough material, it can be difficult to drill extraction holes. When the assembly containing the broken fastener can be moved, improved drilling results are often obtained by securing the assembly to a sturdy machine such as a drill press. However, broken bolts are often encountered in machinery like vehicle engines, where it is impractical to dismantle the assembly so that the bolt can be drilled on a stationary press.

For situations like this, a hand drill may be the next best alternative, but drilling into a tough, small-diameter cylinder (which is often located in an awkward or practically inaccessible spot) without breaking the drill bit or damaging the threading of the bolt hole, can be challenging. A number of universal guides for drilling these sorts of holes are known in the art (see, e.g., U.S. Pat. No. 7,229,237 to Charles Fulgham) but all suffer from drawbacks as discussed below. An improved tool for drilling broken-fastener extraction holes may be of value in this field.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention provide an application-specific template with holes positioned at fixed locations corresponding to bolts or threaded fasteners in the structure for which the template is designed. These templates can only be used to repair a limited number of structures (only those with matching bolt patterns), so they are of restricted applicability compared to an adjustable, universal drill guide such as that described by Fulgham in U.S. Pat. No. 7,229,237, but the fixed, pre-positioned holes in a template are more accurately aligned with the fasteners in the target structure, so drilling results are improved over an adjustable guide where the user must position the guide by hand. In an environment such as a fleet service depot, where most repairs are performed on only a few different machine models, improved alignment accuracy and faster setup more than compensate for the lack of universality.

Figure 1:
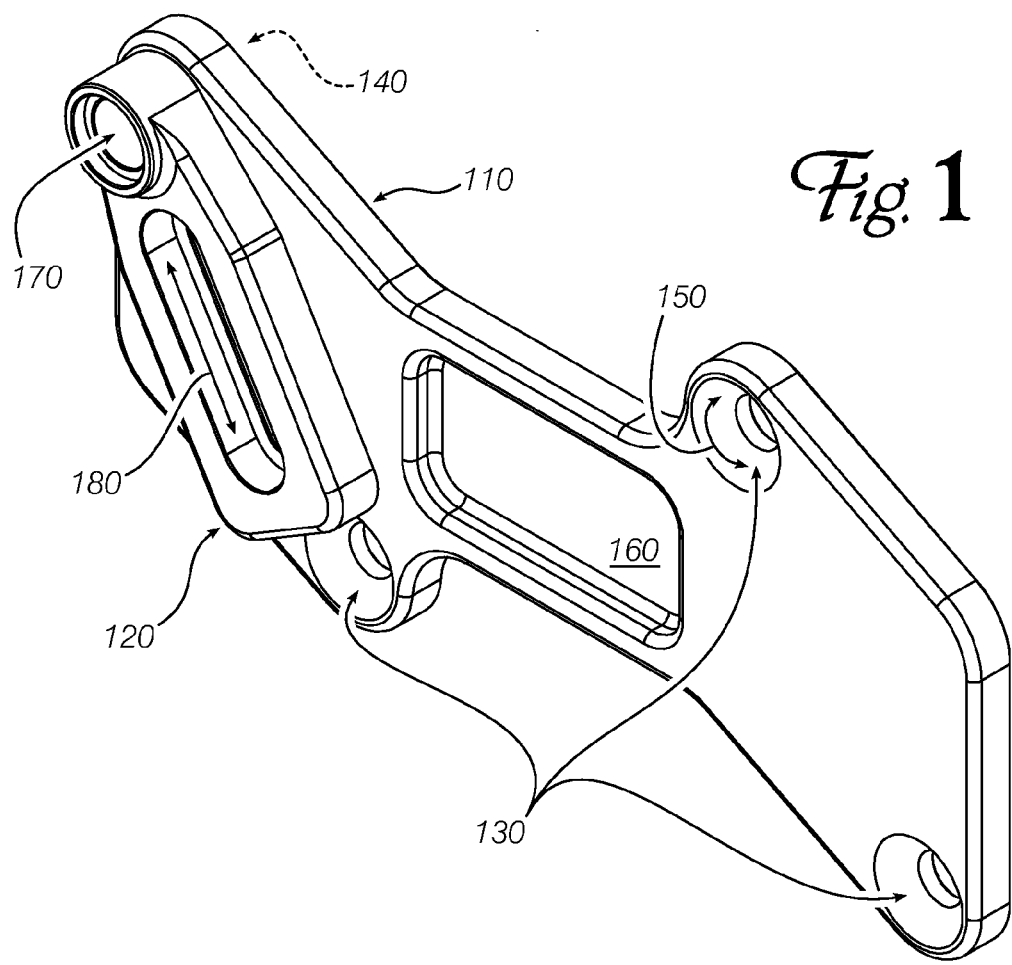
FIG. 1 shows a perspective view of an embodiment of the invention.

FIG. 1 shows a perspective view of the principal elements of an embodiment. The first element is an application-specific base plate 110 that is shaped to fit in/on an assembly containing the broken fastener to be removed. For example, plate 110 is designed to fit on a Ford 6.0~6.4L diesel engine, over the cylinder head exhaust ports, for use in drilling a broken manifold bolt.

The second element is bushing clamp 120, which comprises a circular opening 170 containing a guide bushing to center and direct a drill bit (not shown) inserted therethrough. Bushing clamp 120 also comprises an elongated slot 180 to accept a thumb screw or other attachment mechanism (not shown), which allows the bushing clamp to be secured to the base plate.

Base plate 110 is pierced by a plurality of circular holes that align with threaded holes or studs in the assembly. Three such holes are visible in this Figure, and are indicated by reference character 130; while a fourth hole (near 140) is obscured by the guide bushing end of bushing clamp 120. Each hole has a chamfered or beveled edge as indicated by reference character 150. The surface of the base plate that faces away from the assembly to be repaired may be basically featureless, or may comprise decorative or functional features such as indentation 160, where identification information, usage instructions or the like may be printed, etched or engraved. In some embodiments, the base plate may be skeletonized, with holes or openings over some or all of its surface. This reduces material use and weight, and such holes may be convenient for hanging storage.

Figure 2:
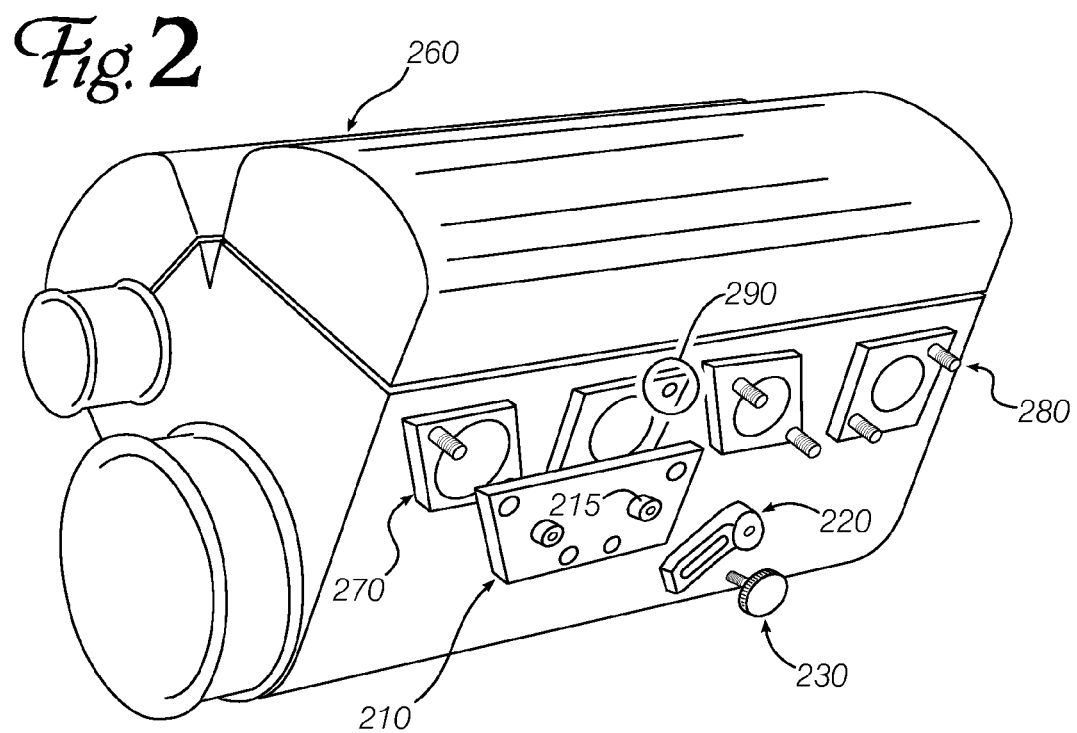
FIG. 2 shows how an embodiment of the invention may be positioned for use.

FIG. 2 shows an example environment where an embodiment of the invention may be useful. Element 260 represents a generic internal-combustion engine, with exhaust ports 270 visible along its left side. The engine's exhaust manifold has been removed, but would be aligned to the exhaust ports by threaded studs 280, and secured with threaded nuts (not shown). One of the threaded studs (at 290) has been broken, and an embodiment of the invention (210, 220, 230) will be used to drill the broken stud in preparation for removal.

The application-specific base plate 210 is placed over the exhaust ports (the remaining unbroken studs will pass through the corresponding holes in the plate). The plate is secured to the engine by the exhaust manifold's nuts, or by conical nuts as described below. Next, bushing clamp 220 is placed against the base plate with threaded boss 215 in the elongated slot, and is secured to the base plate with thumb screw 230. The guide bushing of bushing clamp 220 is aligned and fixed in position by features of the base plate and bushing clamp described shortly. Finally, a hand drill may be used to drill into the broken stud in preparation for removal. The drill's bit is guided and supported by a drill guide bushing held by bushing clamp 220.

Figure 3:
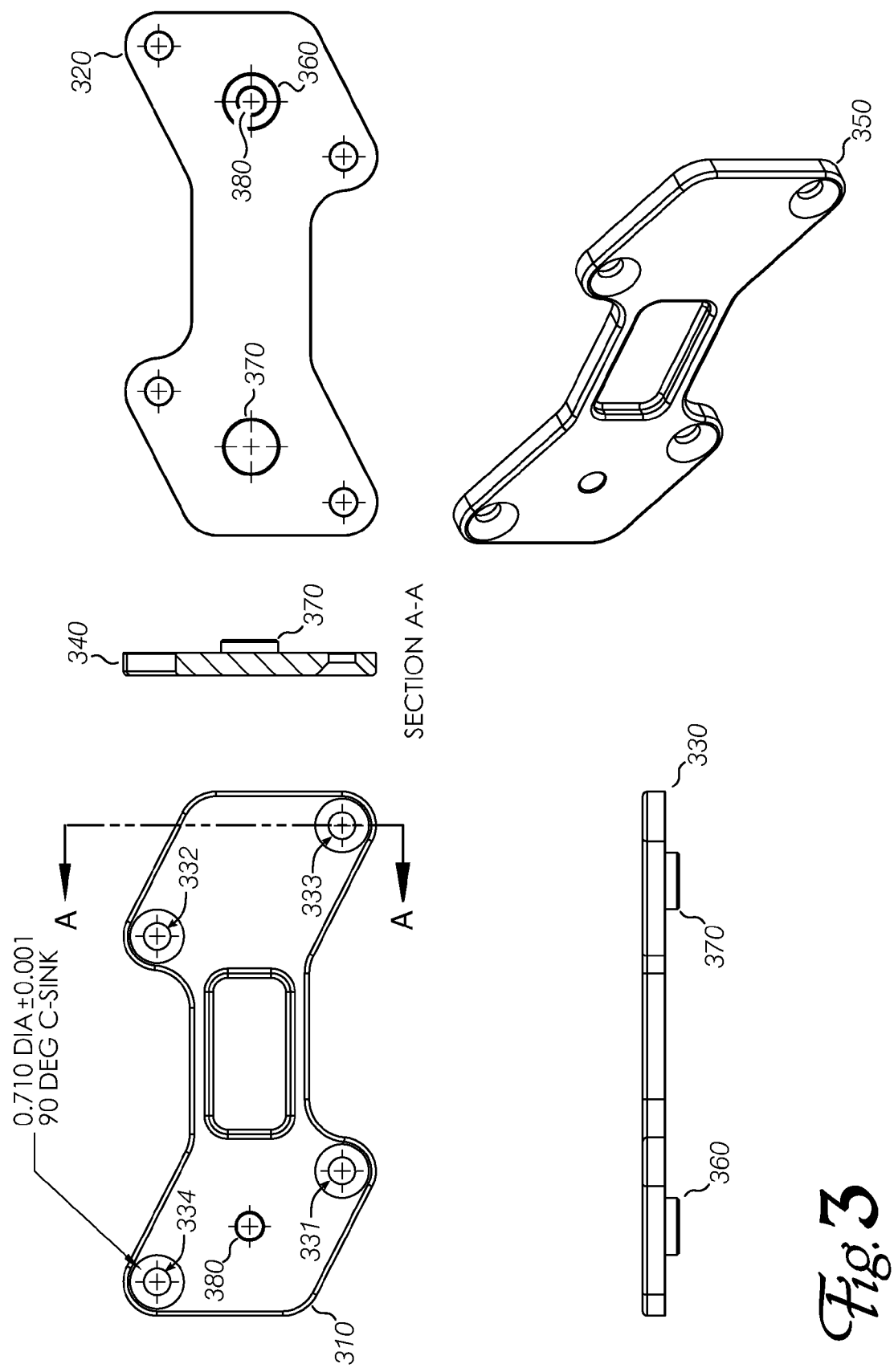
FIG. 3 shows several views of the template base plate of FIG. 1.

FIG. 3 shows several views of the application-specific base plate first shown in FIG. 1. Specifically, there are front and back plan views (310, 320); a bottom view 330, a sectional view 340, and a perspective view 350 that shows features that were obscured by the bushing clamp 120 in FIG. 1. In plan views 310 and 320, all four countersunk mounting holes 331-334 are visible. In the back plan view 320 and bottom view 330, protrusions 360 and 370 are shown. These protrusions extend from the back side of the plate and may engage complementary features on the assembly to which the plate is designed to be mounted. One of the protrusions 360 contains a threaded through hole 380 (also visible in front plan view 310). This threaded hole accepts the thumbscrew that secures the bushing clamp to the template. Only one such threaded hole is necessary for this application because the template is rotationally symmetric: in the position shown in view 310, the bushing clamp could be positioned to drill through holes 331 or 334. To drill bolts positioned under holes 332 or 333, the entire template would be rotated 180° before being secured to the engine.

Figure 4:
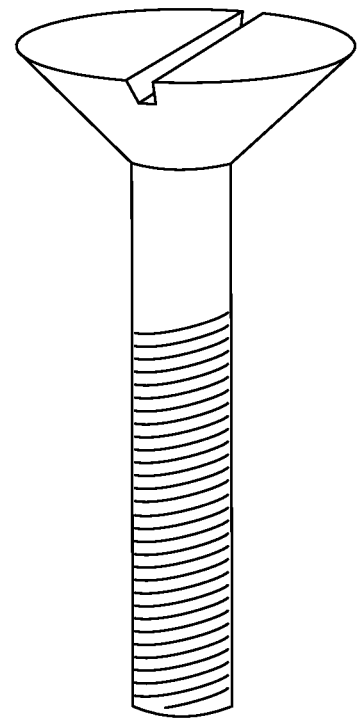
FIGS. 4 and 5 show two threaded fasteners that may be used with an embodiment of the invention.
Figure 5:
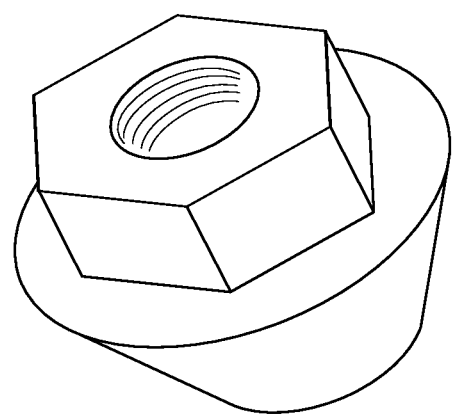

To use this guide tool, the base plate would be mounted to the structure to be drilled by threaded fasteners at at least two, and preferably three, of the mounting holes. The structure's own bolts could be used to secure the base plate, but the tool is preferably supplied with appropriately-sized flathead bolts (FIG. 4). The conical heads of these bolts fit into the countersunk mounting holes and help assure precise positioning of the plate. (In an application where the plate is mounted on threaded studs extending from the structure, the structure's own nuts may be used, or cone nuts [FIG. 5] may be supplied with the tool, serving the same alignment purpose as flathead bolts.) In any event, one of the countersunk mounting holes ends up positioned accurately over the broken bolt.

Figure 6:
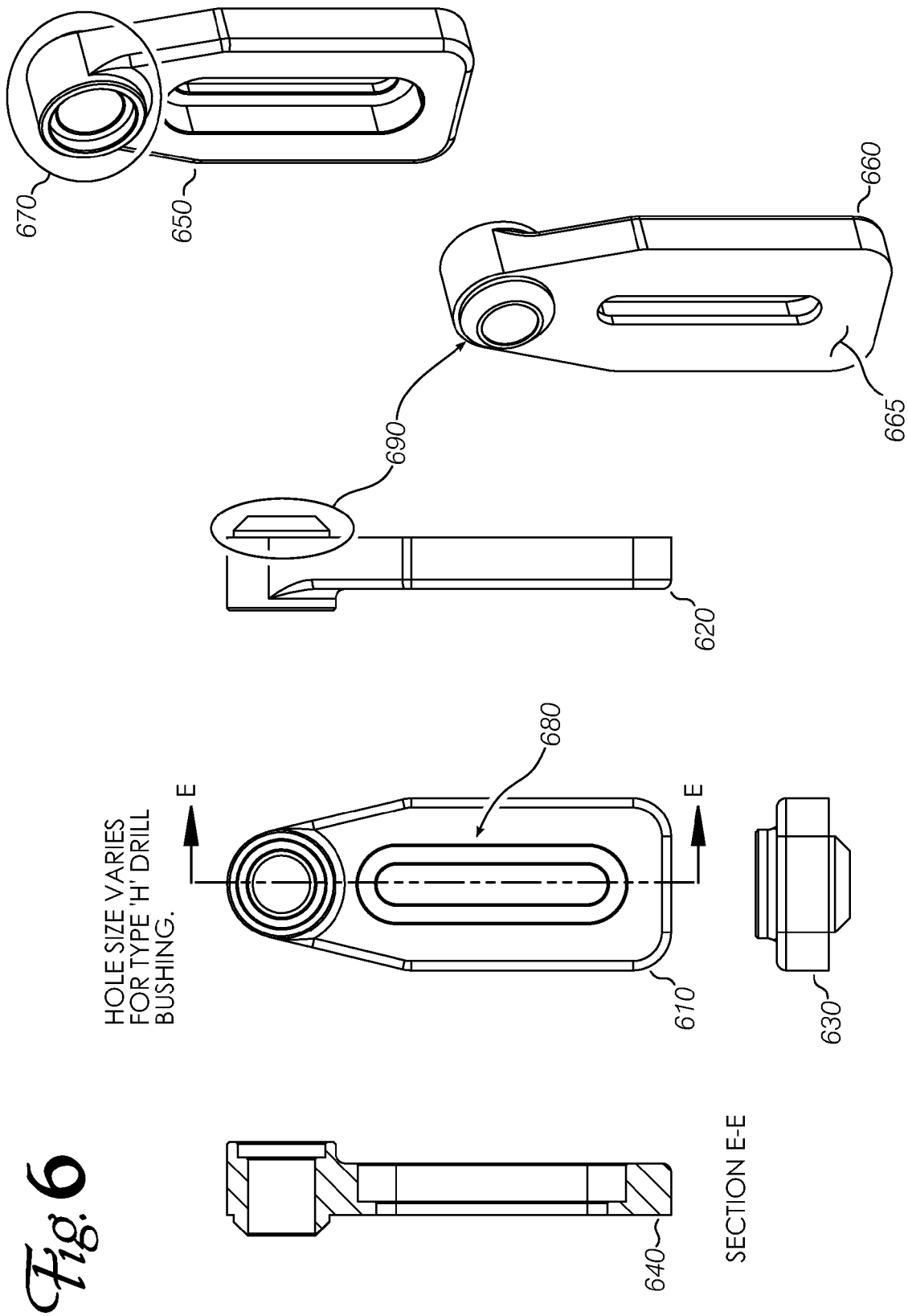
FIG. 6 shows several views of the bushing clamp of FIG. 1.

FIG. 6 shows a number of views of the bushing clamp of an embodiment of the invention. As will be explained shortly, the bushing clamps are constructed to be useable with a variety of template base plates. Bushing clamps differ from one another in the gauge or diameter of the drill guide, but a single set of bushing clamps (of various drill sizes) can be used with any base plate to drill suitably-sized holes in broken threaded fasteners. In this Figure, 610 is a front plan view ("front" and "back" are oriented the same in this Figure as in FIG. 3). 620 is a side view (the sides are mirror images of each other) and 630 is an end view. 640 is a sectional view taken along the line indicated. 650 and 660 are front and back perspective views, respectively.

Most of the back surface of the bushing clamp (e.g., at 665) is flat, so that it can rest stably against the front surface of the template base plate. However, at the end with the drill-guide hole (670), a beveled or conical protrusion 690 extends from the back surface. This protrusion is sized to fit into the beveled or countersunk depressions around each mounting hole in the template base plate. Like the flathead mounting bolts (or cone nuts), the conical protrusion 690 ensures that the centerline of the drill guide is aligned with the centerline of the broken bolt. Elongated slot 680 must be long enough to reach a threaded hole in the base plate (or another securing mechanism) so the bushing clamp can be secured against the base plate. However, note that this securing mechanism is under very little stress and need not be especially robust. Almost the entire force exerted to hold the drill bit in position aligned with the center of the broken fastener is provided by protrusion 690, seated securely in a countersunk hole of the base plate. Other bushing-clamp securing mechanisms include quarter-turn fasteners, spring-loaded fasteners, and 'T' or 'L' shaped toggle arms that can be inserted through an elongated slot, then twisted approximately 90° to hold the bushing clamp against the template base plate and prevent the protrusion from escaping from the countersunk hole.

The bushing clamp shown in FIG. 6 extends a short distance above its main surface on the front side as well. This allows the insertion of a longer drill guide, which may help prevent the drill bit from wandering as it enters the broken bolt.

Figure 7:
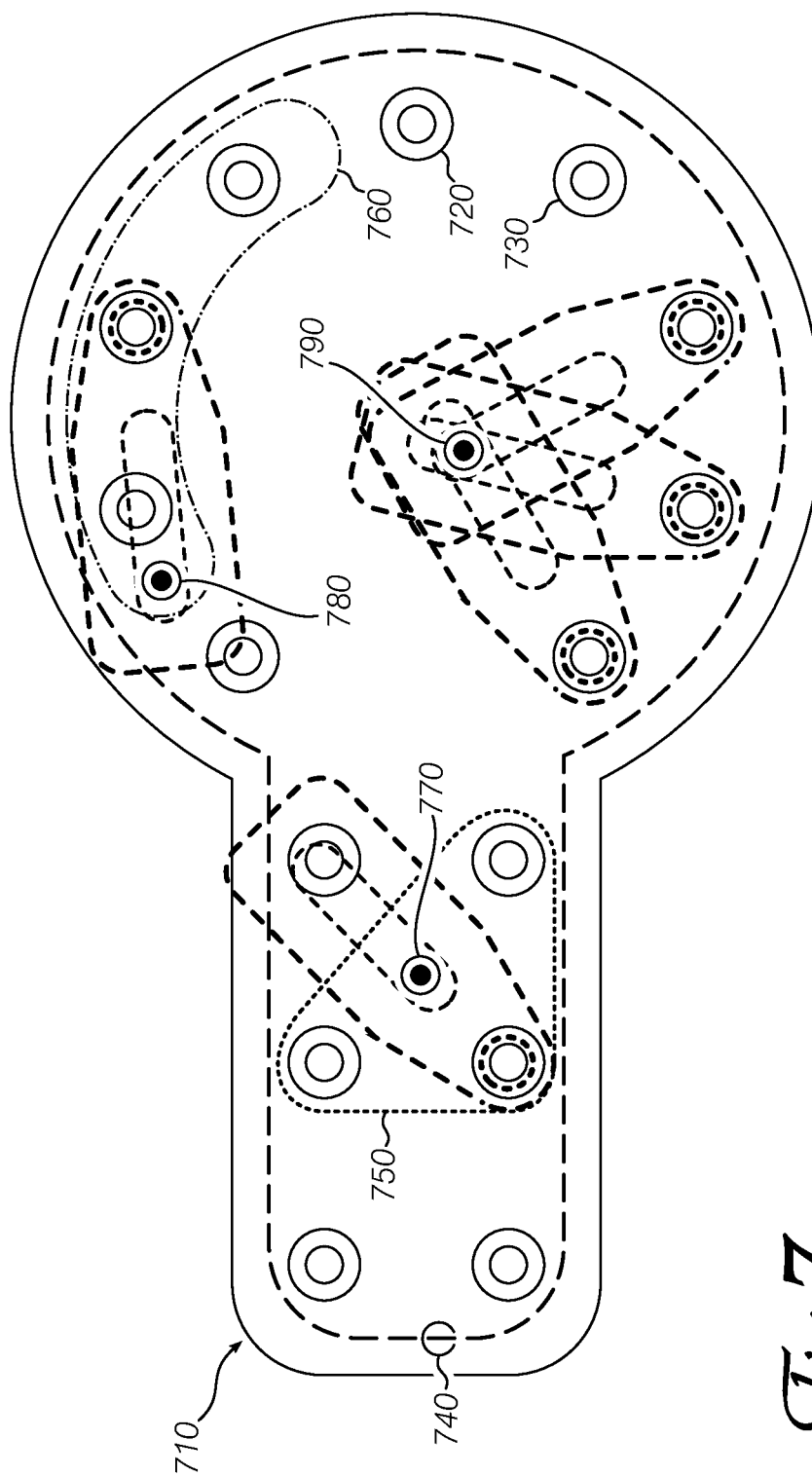
FIG. 7 shows several alternative embodiments for use on an irregularly-shaped structure.

FIG. 7 shows an irregularly-shaped access panel 710 which is secured to its assembly by threaded fasteners around its perimeter. An embodiment of the invention designed for use in repairing these broken fasteners may take a number of forms. First, the template base plate may be shaped similarly to the access plate itself (740). As discussed above, the holes in the template base plate line up with the threaded fasteners of the assembly, and are countersunk on the face away from the assembly so that flathead screws or cone nuts can help align the plate accurately. (These countersunk holes are illustrated as concentric pairs of circles, two of which are identified at 720 and 730.)

An embodiment may be shaped and sized to accommodate only a subset of the fasteners of the irregular assembly. For example, the triangular template at 750 can be used to align with and drill any of the six threaded fasteners at the left side of the access panel. On the other hand, arc-shaped template 760 is suitable for work on the right-hand circle of fasteners. Templates (of whatever shape) include at least one bushing clamp securing mechanism, positioned so that the bushing clamp can be aligned with at least one countersunk hole and secured to the template base plate. (In this figure, bushing clamp securing mechanism locations are marked by black clots at 770, 780 and 790, and possible bushing clamp locations and orientations are shown in heavy clashed lines.)

Both the bushing clamps and template base plates may be made of any suitable rigid, dimensionally stable, relatively strong material. A preferred embodiment is milled from aluminum or aluminum alloy and then hard anodized. A tougher material, such as steel, is not necessary for most applications, although steel drill-guide inserts and threaded inserts for the bushing-clamp-to-base-plate securing mechanism are recommended. In one embodiment, drill guide bushings may be removed from their bushing clamps and replaced if they become damaged. A multi-application base plate may have mounting holes to fit two or more different bolt patterns. For example, a base plate may be useable for both intake and exhaust bolts of an engine, or for the cylinder head bolts of a similar family of four, six and eight-cylinder engines. Arc-shaped (semi-circular) base plates may be useful for repairing broken wheel bolts. In this application, only three holes may be necessary: the plate would be secured by two remaining unbroken bolts at the outer ends of the arc, with the bushing clamp and drill guide aligned with the broken bolt under the center hole. In addition to rotationally-symmetric base plates, some applications with mirror-image bolt patterns may be addressed by a double-sided base plate, which has countersunk holes on both sides. (If a hole may be used from either side, then a thicker base plate may be required to ensure adequate engagement between the countersunk hole and the flathead bolts or bushing clamp protrusion.)

The applications of the present invention have been described largely by reference to specific examples and in terms of particular physical structures or features. However, those of skill in the art will recognize that improved positioning and alignment of holes drilled with a hand drill can also be accomplished by tool guides that are configured differently than described above. Those different configurations are understood to be captured according to their possession of the elements recited in the following claims.

We claim:

1. A guide for drilling any one of a plurality of threaded fasteners of a predetermined assembly, comprising:
   a rigid base plate shaped to rest against the predetermined assembly, with at least three openings located so that the base plate can be secured to the assembly by threaded fasteners through any two of the at least three openings;
   a drill guide having a cylindrical hole to accept a drill bit of a suitable size; and
   means for securing the drill guide to the base plate at any one of the at least three openings so that an axis of the cylindrical hole aligns with a center of the one of the at least three openings, wherein
   each of the at least three openings is countersunk on a surface opposite the assembly, and
   where the countersinking is a beveled edge of the opening.

2. The guide of claim 1 wherein the at least three openings is four openings.

3. The guide of claim 1, further comprising:
   a bushing clamp having a first opening to hold the drill guide and a second opening, wherein
   the means for securing the drill guide to the base plate is a thumbscrew passing through the second opening of the bushing clamp and into a threaded hole in the base plate.

4. The guide of claim 3 wherein the second opening of the bushing clamp is an elongated slot.

5. The guide of claim 3 wherein a back surface of the bushing clamp engages a front surface of the base plate to hold the drill guide in alignment with the center of the one of the at least three openings.

6. The guide of claim 1, further comprising:
   at least two flat-head bolts of size and thread pitch suitable for securing the base plate to the assembly through at least two of the at least three openings.

7. The guide of claim 1 wherein the base plate is constructed from aluminum alloy.

8. The guide of claim 3 wherein the bushing clamp is constructed from aluminum alloy.

9. A broken-bolt repair kit comprising:
   a rigid base plate shaped to rest against a predetermined surface of a structure to be repaired, the base plate having countersunk holes aligned with at least three bolts of the structure to be repaired;
   a plurality of bushing clamps, each having a drill guide for a drill of a different diameter, and
   a manually-operable fastener to secure one of the bushing clamps to the base plate, wherein
   a protrusion on a back of each bushing clamp is configured to mate with any one of the at least three countersunk holes on the base plate so that the drill guide of the bushing clamp is aligned with a centerline of a corresponding one of the at least three bolts of the structure.

10. The broken-bolt repair kit of claim 9, further comprising:
    a plurality of flat-head bolts of size and thread pitch suitable for securing the rigid base plate to the structure through any n of the countersunk holes, n being an integer greater than one and less than a total number of countersunk holes in the base plate.

11. The broken-bolt repair kit of claim 9, further comprising:
    a second rigid base plate shaped to rest against a second predetermined surface of a structure to be repaired, the second rigid base plate having countersunk holes aligned with at least three bolts of the second surface, wherein
    a pattern of the countersunk holes of the first base plate is different than a pattern of the countersunk holes of the second base plate.

12. A tool for aligning and guiding a drill bit to drill into a fragment of a broken threaded fastener of an engine, comprising:
    a rigid base plate having a front surface and a back surface, the back surface configured to rest flat against a surface of the engine;
    a bushing clamp arm having a drill guide bushing at one end; and
    means for securing the bushing clamp arm to the base plate, wherein
    the base plate has at least three holes positioned to align with at least three corresponding threaded fasteners of the engine when the base plate is resting flat against the surface of the engine;
    each of said at least three holes is countersunk on the front surface of the base plate; and
    the bushing clamp arm has a protrusion concentric with the drill guide bushing, said protrusion shaped to engage one of said at least three countersunk holes, said engagement functional to resist horizontal displacement between a centerline of the drill guide bushing and a centerline of the aligned one of the three corresponding threaded fasteners.

13. The tool of claim 12 wherein the means for securing the bushing clamp arm to the base plate is a threaded fastener passing through the bushing arm and into a threaded receptacle of the base plate.

14. The tool of claim 12 wherein the base plate has a second set of at least three holes positioned to align with three different threaded fasteners of the engine, said second set of at least three holes countersunk on the back surface of the base plate, wherein the base plate is to be flipped front-to-back before being secured to the engine by threaded fasteners through at least two holes of the second set of at least three holes.

* * * * *